United States Patent [19]
Akaishi et al.

[11] Patent Number: 5,761,414
[45] Date of Patent: Jun. 2, 1998

[54] METHOD FOR DETECTING EXECUTION ERRORS OF A MICROPROCESSOR

[75] Inventors: Tsuyoshi Akaishi; Yoshihiro Kaneko, both of Gunma-ken, Japan

[73] Assignee: Mitsuba Corporation, Gunma-ken, Japan

[21] Appl. No.: 761,112

[22] Filed: Dec. 5, 1996

[30] Foreign Application Priority Data

Dec. 6, 1995 [JP] Japan ................. 7-344954

[51] Int. Cl.⁶ .................................. G06F 11/30
[52] U.S. Cl. ................... 395/185.08; 371/62
[58] Field of Search ............. 395/185.08, 185.04; 371/57.2, 61, 62; 364/267.9

[56] References Cited

U.S. PATENT DOCUMENTS

| | | | |
|---|---|---|---|
| 4,355,359 | 10/1982 | Kanegae et al. | 701/102 |
| 4,410,938 | 10/1983 | Higashiyama | 364/200 |
| 4,982,404 | 1/1991 | Hartman | 395/185.08 |
| 5,247,163 | 9/1993 | Ohno et al. | 395/185.08 |
| 5,398,332 | 3/1995 | Komoda et al. | 395/575 |
| 5,408,643 | 4/1995 | Katayose | 395/185.08 |

FOREIGN PATENT DOCUMENTS

| | | | |
|---|---|---|---|
| 60-42341 | 9/1985 | Japan | F02P 05/08 |
| 4-64099 | 10/1992 | Japan | G06F 11/30 |

Primary Examiner—Robert W. Beausoliel, Jr.
Assistant Examiner—Scott T. Baderman
Attorney, Agent, or Firm—Skjerven, Morrill, MacPherson Franklin and Friel L.L.P.; Alan H. MacPherson

[57] ABSTRACT

According to the method of the present invention for detecting errors in executing a program including a main routine and an interrupt routine in a microprocessor, execution errors can be detected irrespective of whether it occurred in a main routine or an interrupt routine. A cancel code for a watchdog timer is entered in the variable value data DT in the main routine, and a count value TC of a watchdog canceling timer is incremented by one in the interrupt routine. If the count value TC has reached a prescribed value, the value of the data DT is supplied to the watchdog timer, and both the count value TC and the data DT are set to zero. In case of an execution error preventing the program flow from advancing from the main routine to the interrupt routine, the data DT is not supplied to the watchdog timer, and the watchdog time is allowed to reset the microprocessor. In case of an execution error preventing the program flow from returning from the interrupt routine to the main routine, the data DT is may be supplied to the watchdog timer but because the data DT continues to hold the zero value, the watchdog time is again allowed to reset the microprocessor. Therefore, in either case, the watchdog timer is not canceled, and the microprocessor is reset by the watchdog timer circuit without fail.

6 Claims, 4 Drawing Sheets

METHOD FOR DETECTING EXECUTION ERRORS OF A MICROPROCESSOR

TECHNICAL FIELD

The present invention relates to a method for detecting errors in executing a program including a main routine and an interrupt routine in a microprocessor.

BACKGROUND OF THE INVENTION

In many conventional control systems, programs are executed by using microprocessors, and various methods for detecting execution errors have been proposed to avoid operation errors of the microprocessors. For instance, Japanese patent publication (kokoku) No. 60-42341 discloses an electronic control system for controlling internal combustion engines which can regain its normal operation even when its program has ceased to be executed normally. One of such systems is briefly outlined in the following with reference to FIGS. 4 and 5.

The execution error detecting circuit of the control system comprises a microprocessor 11 and a timer 12 as illustrated in FIG. 4, and a pulse signal of a prescribed period is forwarded from a watchdog timer terminal WD of the microprocessor 11 to the tirer 12. The timer 12 supplies a reset signal to the microprocessor 11 when it fails to receive the watchdog timer signal WD for more than a prescribed time period.

Referring to FIG. 5 showing a part of the program of the microprocessor 11, the output state of the watchdog timer signal WD is determined in step ST41 of the main routine of the program. When the output of the watchdog timer signal WD is off, the program flow advances to step ST42, and the output of the watchdog timer signal WD is turned on. If the output of the watchdog timer signal WD is on in step 41, the program flow advances to step ST43, and the output of the watchdog timer signal WD is turned off. A pulse signal of a prescribed period is generated in this fashion as the main routine is executed normally. The timer 12 is thus continually reset by this pulse signal, and would not reset the microprocessor 11 as long as it keeps receiving this pulse signal.

When the program flow fails to return from an interrupt routine to the main routine by an execution error, the watchdog timer signal WD is kept at a fixed level, and the pulse signal ceases to be produced from the watchdog timer output WD. As it is equivalent to having no watchdog timer signal WD, if this state has persisted for more than a prescribed time period, a reset signal is forwarded from the timer 12 to the microprocessor 11 to initialize it, thereby allowing the main routine to be executed.

However, according to this conventional control process, although it is possible to detect an execution error and re-initialize the microprocessor when the program flow fails to return from an interrupt routine to the main routine, it may not be possible to detect an execution error when the program flow fails to advance from the main routine to the interrupt routine.

BRIEF SUMMARY OF THE INVENTION

In view of such problems of the prior art, a primary object of the present invention is to provide a method for detecting errors in executing a program including a main routine and an interrupt routine which allows the microprocessor for executing the program to be reset whenever any fault occurs in the execution of the program.

A second object of the present invention is to provide a method for detecting errors in executing a program which allows the microprocessor to be reset without fail irrespective of whether an execution error occurred in the main routine or in the interrupt routine.

A third object of the present invention is to provide a method for detecting errors in executing a program which can improve the reliability of the execution of the program at a minimum cost.

According to the present invention, such objects can be accomplished by providing a method for detecting errors in executing a program including a first routine and a second routine in a microprocessor, the microprocessor being provided, either internally or externally, with a watchdog timer which resets the microprocessor upon counting up a first time period, but can be itself reset by a cancel code, comprising the steps of: starting a watchdog canceling timer in an initial step of a first routine; starting execution of remaining steps of the first routine, the remaining steps including the step of entering a cancel code in variable value data; executing a second routine as required until the watchdog canceling timer counts up a second time period which is substantially shorter than the first time period; and upon the watchdog canceling timer counting up the second time period in the second routine, supplying the content of the variable value data to the watchdog timer, restarting the watchdog canceling timer in the second routine, entering an initial code different from the cancel code in the variable value data in the second routine, and returning to one of the remaining steps of the first routine. Typically, the first routine consists of a main routine, and the second routine consists of an interrupt routine.

In case of an execution error preventing the program flow from advancing from the main routine to the interrupt routine, the variable value data is not supplied to the watchdog timer, and the watchdog time is therefore allowed to reset the microprocessor. In case of an execution error preventing the program flow from returning from the interrupt routine to the main routine, the variable value data may be supplied to the watchdog timer but because the variable value data continues to hold the initial code instead of the reset code, the watchdog time is again allowed to reset the microprocessor. Therefore, in either case, the watchdog timer is not canceled, and the microprocessor is reset by the watchdog timer without fail.

Alternatively, the watchdog timer may be constructed such that it can be itself reset by a prescribed pulse signal. In this case, the content of the variable value data may be supplied to the watchdog timer following the step of entering an initial code different from the cancel code in the variable value data in the second routine upon the watchdog canceling timer counting up the second time period in the second routine. Such an embodiment may achieve an even more reliable watchdog function.

The watchdog canceling timer may consist of a software timer which is incremented at each cycle of execution of the second routine. As a matter of fact, the method of the present invention can be at least most part implemented by computer software.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1A:
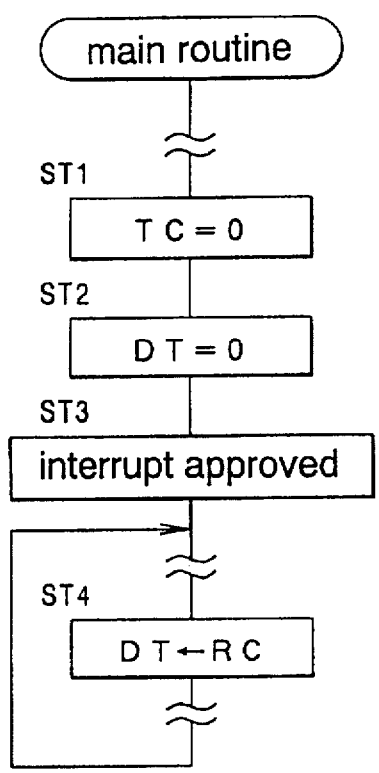
FIG. 1(a) is a flow chart showing a part of a main routine of an ignition control program for an automotive internal combustion engine to which the present invention is applied.
Figure 1B:
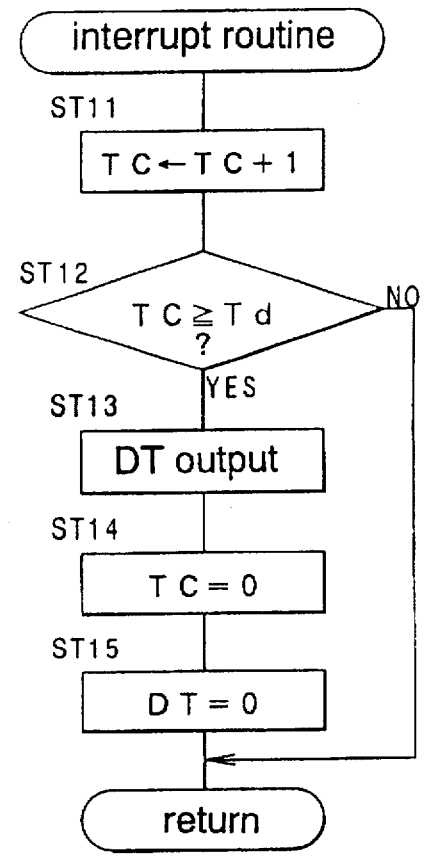
FIG. 1(b) is a similar flow chart showing a part of an interrupt routine.
Figure 2:
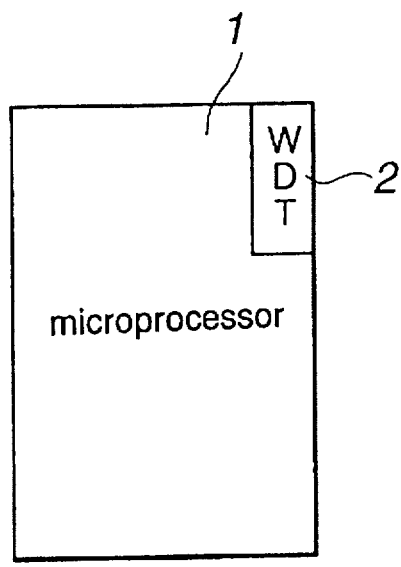
FIG. 2 is a simplified block diagram showing a part of the structure of the microprocessor to which the present invention is applied.
Figure 4:
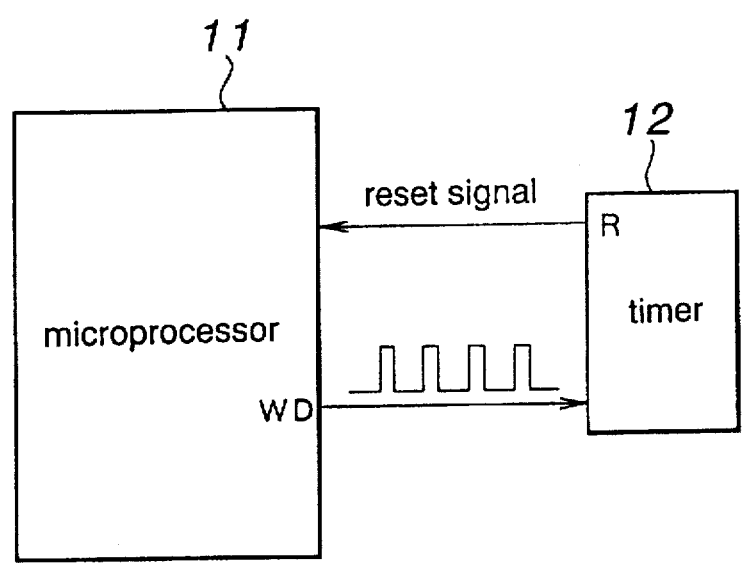
FIG. 4 is a block diagram showing a part of a conventional control circuit.

FIG. 1(a) and 1(b) are flow charts showing a part of the ignition control program of an automotive internal combustion engine, and FIG. 2 illustrates the structure of a microprocessor 1 which executes the program. As shown in FIG. 2, the microprocessor 1 incorporates a watchdog timer circuit 2 which produces an initialization signal or a reset signal for the microprocessor 1 when the timer circuit is allowed to count up a first time period without being reset.

The main routine shown in FIG. 1(a) is executed as follows. The count value TC of a watchdog cancel timer which is typically incorporated in the microprocessor 1 is set to zero in step ST1, and an initial value consisting of zero is substituted into variable value data DT and stored in memory of the microprocessor 1 in step ST2. Execution of the interrupt routine is then approved in step ST3. This is an initialization step allowing an interrupt routine to be executed as required during the execution of the main routine. A number of other control steps not shown in the drawing are thereafter executed in the main routine, and during the course of executing the main routine, a cancel code for the watchdog timer circuit 2 is substituted into the data DT at a certain interval. It is represented by step ST4.

The interrupt routine shown in FIG. 1(b) is executed as follows. The count value TC of the watchdog cancel timer is incremented by one in step ST11, and it is determined if the count value TC has reached a prescribed value Td in step ST12. The prescribed value Td corresponds to a prescribed number of times by which the interrupt routine is executed, and that the count value TC has reached the prescribed value Td means that a second time period has elapsed. In other words, the interrupt routine is executed as required, but upon elapsing of the second time period, the program flow eventually advances to step ST13 as the interrupt routine is executed. The second time period is selected so as to be substantially shorter than the first time period associated with the watchdog timer circuit 2 for resetting the microprocessor 1.

The content of the variable value data DT is supplied to the watchdog timer circuit 2 in step ST13. The count value TC is set to zero in step ST14, and the variable value data DT is reduced to zero in step ST15. If the count value TC has not reached the prescribed value Td in step ST12, the interrupt routine is concluded without executing steps ST13 to ST15.

In this program, after the count value TC and the variable value data DT are set to zero in the main routine, a cancel code for the watchdog timer circuit 2 is substituted into the data DT, and the count value TC is incremented by one every time the interrupt routine is executed. When the count value TC has reached the prescribed value (after the second time period has elapsed), the current value of the variable value data DT is supplied to the watchdog timer circuit 2. This resets the watchdog timer circuit 2, and prevents it from resetting the microprocessor 1. In other words, the microprocessor 1 is allowed to operate normally. After setting the count value TC and the variable value data DT to zero, the program flow returns to the main routine.

Therefore, in case of an execution error which prevents the program flow from returning from the interrupt routine to the main routine, a first reset signal may be supplied to the watchdog timer circuit 2 (in step ST13), but, thereafter, because the variable value data DT is replaced from a cancel code to a zero value in step ST15, the watchdog timer circuit 2 will not be reset even after the second time period has elapsed. Therefore, the watchdog timer circuit 2 supplies a reset signal to the microprocessor 1 upon elapsing of the first time period from the time the watchdog timer circuit 2 is started. Therefore, an execution error can be detected, and the microprocessor 1 is reset. In case of an execution error which prevents the program flow from advancing from the main routine to the interrupt routine, although the cancel code may be substituted into the variable value data DT in step ST4, this value is never supplied to the watchdog timer circuit 2, and the initialization signal for resetting the microprocessor 1 is therefore again produced upon elapsing of the first time period from the time the watchdog timer circuit 2 is started. Therefore, an execution error can be detected, and the microprocessor can be appropriately reset. In this way, an execution error can be detected irrespective of whether it occurred in the main routine or in the interrupt routine, and the microprocessor can be promptly initialized without fail.

According to the above described embodiment, the microprocessor was initialized by using the initialization signal of the watchdog timer circuit 2, but it is also possible to use a separate timer and initialize the microprocessor upon timing up of this timer. In other words, a signal value equivalent to the timer cancel code may be substituted into the variable value data DT in step ST4, and the cancel code value may be supplied to the timer in step ST13 so that the same result may be achieved by repeatedly initializing the watchdog timer before the initialization signal is produced by the timing up of the timer.

Figure 3A:
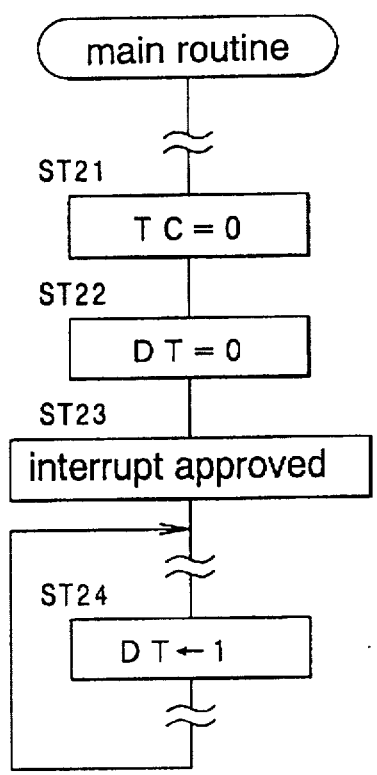
FIGS. 3(a) and (b) are views similar to FIG. 1(a) and 1(b) showing a second embodiment of the present invention.

Another embodiment of the present invention is described in the following with reference to FIG. 3. FIG. 3(a) shows a main routine similar to the main routine shown in FIG. 1(a), and FIG. 3(b) shows an interrupt routine similar to the interrupt routine of FIG. 1(b). As shown in FIG. 3(a), steps ST21 to ST23 are similar to steps ST1 to ST3 of the first embodiment, but "1" instead of the reset code RC of the watchdog timer circuit 2 is substituted into the variable value data DT in step ST24.

Figure 3B:
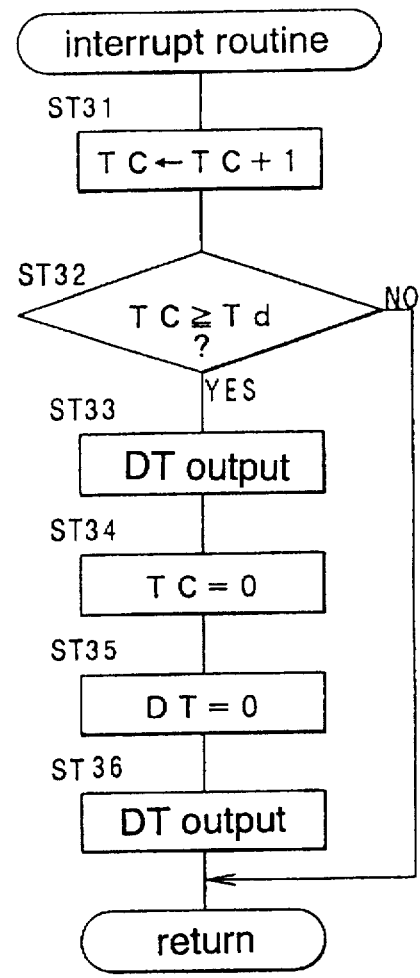
Figure 5:
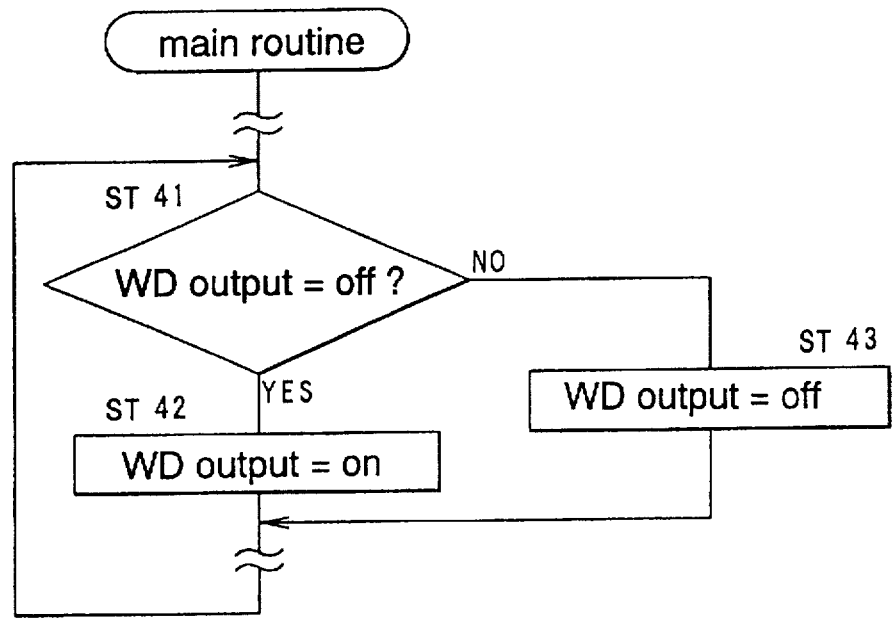
FIG. 5 is a flow chart showing a part of a conventional control process.

In the interrupt routine shown in FIG. 3(b), steps ST31 to ST35 are similar to steps ST11 to ST15 of the first embodiment, but step ST36 is placed after step ST35 to supply the current value of the variable value data DT to the watchdog timer circuit 2. If the count value TC has not reached the prescribed value Td in step ST32, the interrupt routine is concluded without executing steps ST33 to ST36.

Thus, "1" is substituted into the data DT in step ST24 of the main routine while, in the interrupt routine, the current value of the data DT is produced in step ST33, and after zero is supplied to the data DT is step ST35, the current value (zero) of the data DT is produced in step ST36. Therefore, when the program is executed normally, the data output consists of a pulse signal of a prescribed period so that the watchdog timer circuit 2 can determine the normal operation of the microprocessor, and no initialization signal is produced from the watchdog timer circuit 2.

In case of an execution error which prevents the program flow from returning from the interrupt routine to the main routine, the output value of the data DT is zero both in step ST33 and step ST36, and the pulse signal of a prescribed period is therefore not produced. In case of an execution error which prevents the program flow from advancing from the main routine to the interrupt routine, there is no output from the data DT, and the watchdog timer circuit 2 can thereby detect an execution error.

According to the present invention, because a prescribed value which was entered as data in the main routine is produced from the interrupt routine while the data is reset at the same time after elapsing of a certain time period, the value of the data would not change after elapsing of the certain time period whenever an execution error occurred in the main routine or in the interrupt routine. Therefore, the method of the present invention allows an execution error to be detected irrespective of whether it occurred in the main routine or in the interrupt routine.

Although the present invention has been described in terms of specific embodiments thereof, it is possible to modify and alter details thereof without departing from the spirit of the present invention.

What we claim is:

1. A method for detecting errors in executing a program including a first routine and a second routine in a microprocessor, said microprocessor being provided, either internally or externally, with a watchdog timer which resets said microprocessor upon counting up a first time period, but can be itself reset by a cancel code, comprising the steps of:

starting a watchdog canceling timer in an initial step of a first routine;

starting execution of remaining steps of the first routine, said remaining steps including a step of entering a cancel code in variable value data;

executing a second routine as required until said watchdog canceling timer counts up a second time period which is substantially shorter than said first time period; and upon said watchdog canceling timer counting up said second time period in the second routine, supplying the content of said variable value data to said watchdog timer, restarting said watchdog canceling timer in the second routine, entering an initial code different from said cancel code in said variable value data in the second routine, and returning to one of said remaining steps of the first routine.

2. A method for detecting errors in executing a program according to claim 1, wherein the first routine consists of a main routine, and the second routine consists of an interrupt routine.

3. A method for detecting errors in executing a program according to claim 1, wherein said watchdog canceling timer consists of a software timer which is incremented at each cycle of execution of the second routine.

4. A method for detecting errors in executing a program including a first routine and a second routine in a microprocessor, said microprocessor being provided, either internally or externally, with a watchdog timer which resets said microprocessor upon counting up a first time period, but can be itself reset by a prescribed pulse signal, comprising the steps of:

starting a watchdog canceling timer in an initial step of a first routine;

starting execution of remaining steps of the first routine, said remaining steps including a step of entering a cancel code in variable value data;

executing a second routine as required until said watchdog canceling timer counts up a second time period which is substantially shorter than said first time period; and upon said watchdog canceling timer counting up said second time period in the second routine, supplying the content of said variable value data to said watchdog timer, restarting said watchdog canceling timer in the second routine, entering an initial code different from said cancel code in said variable value data in the second routine, supplying the content of said variable value data to said watchdog timer, and returning to one of said remaining steps of the first routine.

5. A method for detecting errors in executing a program according to claim 4, wherein the first routine consists of a main routine, and the second routine consists of an interrupt routine.

6. A method for detecting errors in executing a program according to claim 4, wherein said watchdog canceling timer consists of a software timer which is incremented at each cycle of execution of the second routine.

* * * * *